United States Patent [19]
Baus, Jr.

[11] Patent Number: 5,650,606
[45] Date of Patent: Jul. 22, 1997

[54] ACCURATE READ/WRITE HEAD FOR PREVENTING CREDIT CARD ALTERATION AND COUNTERFEITING OF DEBIT CARDS

[75] Inventor: Rene Baus, Jr., New Liberia, La.

[73] Assignee: Magnetic Products International, Corp., New Iberia, La.

[21] Appl. No.: 511,921

[22] Filed: Aug. 7, 1995

[51] Int. Cl.⁶ .................................................. G06K 7/08
[52] U.S. Cl. .................................................. 235/449
[58] Field of Search .................... 235/449, 380, 235/381, 382; 360/113

[56] References Cited

U.S. PATENT DOCUMENTS

| | | | |
|---|---|---|---|
| 3,662,343 | 5/1972 | Goldstein et al. | 235/381 |
| 3,908,194 | 9/1975 | Romankin | 360/113 |
| 3,949,193 | 4/1976 | Dowdell | 235/449 |
| 4,182,481 | 1/1980 | Maussion | 235/449 |
| 5,010,240 | 4/1991 | Sheldon | 235/382 |
| 5,206,489 | 4/1993 | Warwick | 235/449 |
| 5,235,166 | 8/1993 | Fernadez | 235/449 |
| 5,254,843 | 10/1993 | Hymes et al. | 235/449 |
| 5,266,786 | 11/1993 | Mazumder | 235/449 |
| 5,289,122 | 2/1994 | Shigeno | 235/449 X |

*Primary Examiner*—Donald T. Hajec
*Assistant Examiner*—Jeffrey R. Filipek
*Attorney, Agent, or Firm*—Herbert M. Shapiro

[57] ABSTRACT

A novel write/read head for magnetic stripe card readers includes a magnetostrictive read element in a structure which permits the close spacing between read and write heads required of insertion type value card apparatus yet provides magnetic isolation of the read head from the write field generated at the gap of the write head. The use of a second magnetostrictive element in the read head permits the implementation of a security system which precludes the possibility of altering or counterfeiting the cards. Accordingly, high denomination value cards can be issued with a relatively high degree of confidence and that magnetic stripe cards, in general, can be issued with that same degree of confidence.

7 Claims, 12 Drawing Sheets

WRITE

FIG. 15

READ

FIG. 16

DECODE READ

FIG. 17

WRITE

FIG. 18

READ

FIG. 19

DECODE READ

ACCURATE READ/WRITE HEAD FOR PREVENTING CREDIT CARD ALTERATION AND COUNTERFEITING OF DEBIT CARDS

FIELD OF THE INVENTION

This invention relates to apparatus for writing and reading data on magnetic stripe cards in general and in particular to magnetic stripe cards which require rewriting the card each time the card is used.

BACKGROUND OF THE INVENTION

Value cards or decrement cards are in widespread use worldwide. The cards are purchased by individuals from a card-issuing agency for use in telephones, vending machines, public transportation facilities and toll booths. They are in use, for example, in the Washington, D.C. subway system. The initial value of a given card is determined by the purchase price an individual pays for the card.

Access to goods and services, via a value card, is controlled by machines which accept, read, and verify the card. Upon completion of a transaction, the machine deducts the price from the value of the card by means of rewriting (and read-verifying) new card data leaving the process of card removal by the card owner. The owner can continue the use of the card until the value is exhausted.

Unfortunately, present value cards lack security because the cards are easily counterfeited or altered. Consequently, the use of magnetic stripe cards in the value card field has been limited to low denominations (i.e. under $100.00) where financial exposure is limited. In order for such cards to be used for higher denomination transactions higher degree of security is required.

BRIEF DESCRIPTION OF THE INVENTION

In accordance with the principles of this invention, a security system is provided which takes advantage of the read/write accuracy of a novel self-clocking read/write head to implement a security system which prevents counterfeiting and card alteration. The system is operative to generate a new security number each time the card is used. Further the system employs an algorithm which is operative to induce jitters purposefully to generate and subsequently read unique security numbers.

The novel read/write head comprises a write head with one or two magnetoresistive read heads. The write head contains a gap and a coil. When current flow is imposed on the coil, the write head generates a fringing magnetic field that magnetizes the magnetic stripe, of a coupled magnetic stripe card, in a given direction depending on the direction of current flow. Thus, as a card moves past the head gap, a programmed sequence of current reversals generates flux reversals on the stripe which represent the encoded data, a set of binary ones and zeros, as is well understood.

In the write process, the magnetoresistive read head furnishes sensing signals which precisely locate the flux reversals written on the coupled magnetic stripe, independent of card velocity or acceleration. In one embodiment, a read/write head herein comprises a rectangular plate of high permeability magnetic material to one side of which lies the magnetoresistive read head. The write head is located on the other side of the plate. The high relative permeability (i.e. over 100,000) of the plate material serves to isolate the read element from the strong magnetic field generated at the write gap. A read/write head structure which locates the write and read heads in very close proximity and still avoids the inherent high cross-feed between such heads, as is common with conventional read and write heads, is considered a significant departure from prior art thinking. The structure permits a low cost, reliable means for writing and reading data on a magnetic stripe which is of sufficient low cost to be used with a value card. With value cards, the structure permits the realization of an ideal hand drawn device that is free of the high cost of motor drives and encoders which would read on card insertion and would rewrite the card and verify its correctness when the card is being removed.

In another embodiment, two magnetoresistive films are employed for the read operation. The unique read/write head permits the implementation of a simple security system which prevents alteration or counterfeiting of a magnetic stripe card. U.S. Pat. No. 4,628,195, issued December 1986 to Rene Baus, discloses a method for improving the security of magnetic stripe cards by employing the inherent jitter pattern of encoded data on the magnetic stripe to identify a particular magnetic stripe card. In accordance with another aspect of this invention, the unique read/write structure of the head permits a system to be realized which totally prevents counterfeiting and card alteration by purposely inducing a unique jitter pattern to generate and subsequently read a unique security number each time the card is used. The security system employs an algorithm which controls the jitter pattern as well as a central store which stores the number each time a transaction occurs.

DETAILED DESCRIPTION OF ILLUSTRATIVE EMBODIMENTS OF THIS INVENTION

Figure 1:
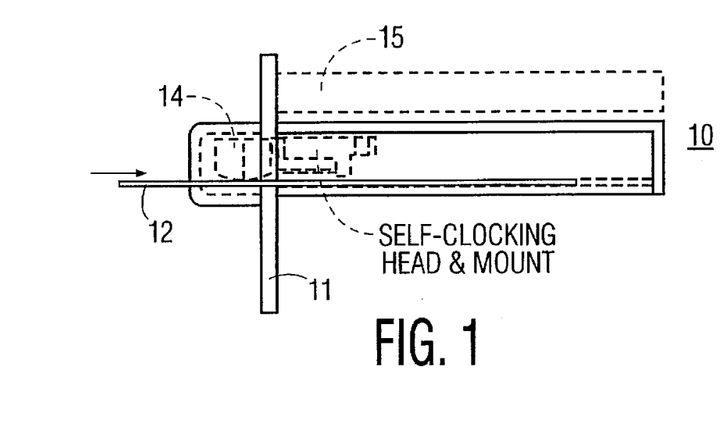
FIG. 1 is a schematic representation of an insert card reader in common use with a value card with a magnetic stripe.

FIG. 1 shows an insert reader 10 secured to a frame represented at 11 and positioned for a card 12 to be inserted from the left, as viewed. A self-clocking head 14, in accordance with the principles of this invention, is positioned for coupling to the magnetic stripe (not shown) as it is inserted and withdrawn from the reader. The card is read on insertion and written and read-verified on withdrawal. The self-clocking electronics is represented by block 15.

Figure 2:
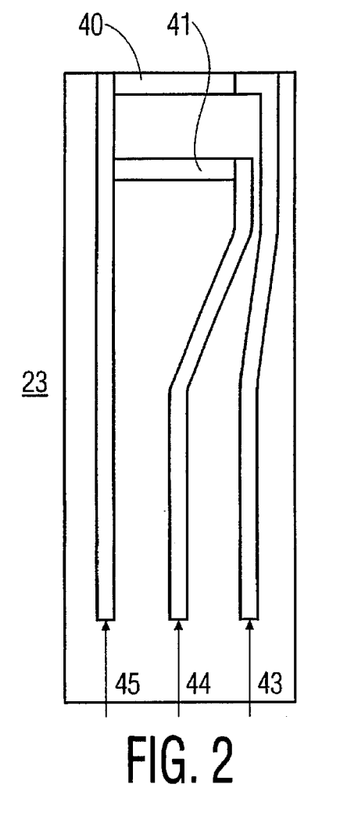
FIGS. 2, 3, and 4 are enlarged views of a read/write head in accordance with the principles of this invention illustrating the layout of the magnetoresistive elements, the cross section of the head and the layout of the write head respectively.
Figure 3:
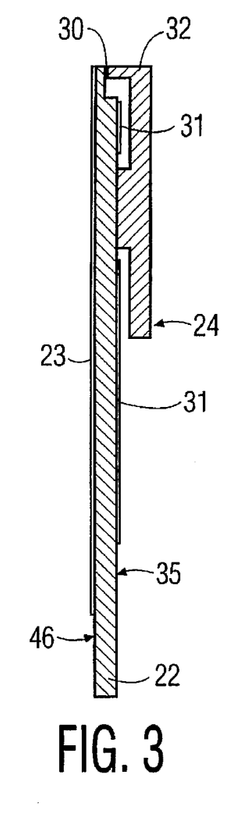
Figure 4:
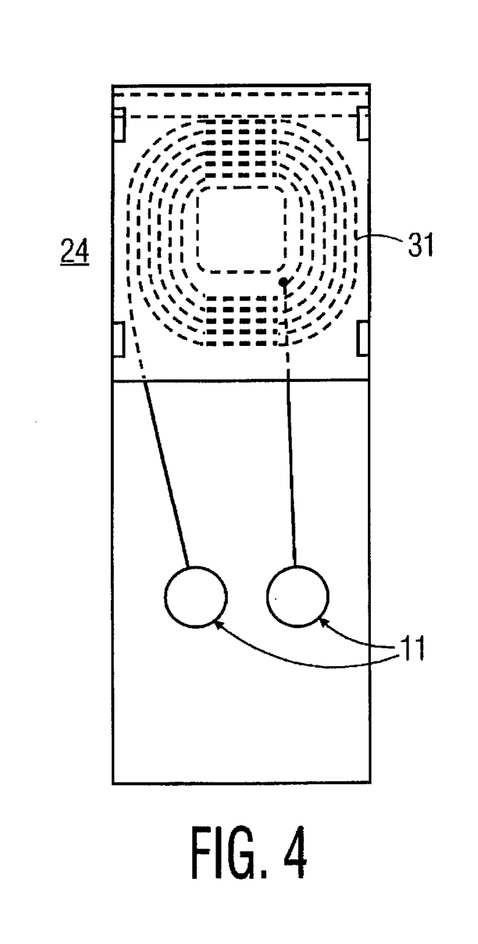

FIGS. 2, 3, and 4 depict enlarged views of a read/write head in accordance with the principles of this invention. The main structural element of the head is a rectangular plate 22 which, in practice, is about 0.110 inch wide by 0.300 inch high by 0.002 inch thick. The plate is composed of high permeability magnetic material such as mu-metal or supermalloy. The magnetoresistive read head 23 lies one side of plate 22 and the write head lies to the other side of the plate as represented in the figures. The relatively high relative permeability (i.e. >100,000) of the plate material coupled with the low reluctance geometry of the plate structure serve to isolate the read element(s) from the strong magnetic field generated at the gap of the write head. The physical dimensions and materials described herein are chosen to be suitable for reading and writing on magnetic stripe cards that are in accordance with ANSI and ISO standards. Other standards and applications employing the principles of this invention may require different head dimensions and spacing between the read and write elements.

The various layers that constitute the write head and read head structures can be batched fabricated using well known techniques of vacuum sputtering, electroplating chemical deposition, ion etching and photoresist lithography. These are the same techniques developed for producing large scale integrated circuit chips and high density magnetoresistive digital heads for disks and tapes.

Figure 5:
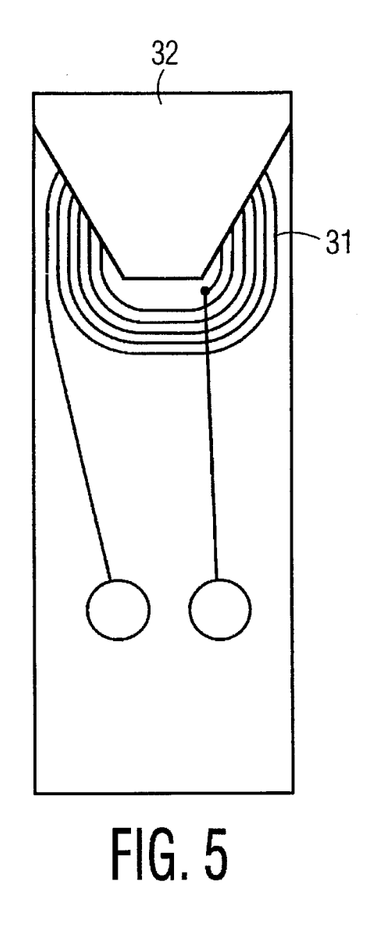
FIGS. 5 and 6 are top and cross section views of the read/write head of FIGS. 2, 3, and 4 showing a cover in place over the write head.
Figure 6:
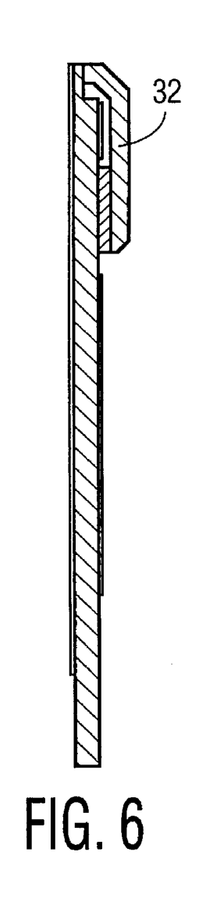

The write head (24) of FIGS. 3 and 4 consists of a gap 30, a write coil 31, and a high permeability cover 32, shown also in FIGS. 5 and 6, which completes the write gap flux path. The gap is filled by a copper layer deposited on the top end of plate 22. The gap is formed by the top portions of plate 22 and cover 32. A silicon dioxide layer 35 of FIG. 3 insulates coil 31 (and its two leads) from plate 22. The read head of FIG. 2 contains a first and second magnetoresistive elements 40 and 41 with copper connector 43, 44, and 45. A thin silicon oxide layer 46 (see FIG. 3) insulates the magnetoresistive elements, and connectors 43, 44, and 45, from plate 22. Only one magnetoresistive element (i.e. element 40) is affected by the magnetic field of the card stripe. Element 41 is isolated from the stripe field by its relatively large distance from the card and its close proximity to plate 22 which short circuits the stripe flux before the flux reaches element 41. The purpose of element 41 is to minimize common mode external noise that affects both elements 40 and 41 equally. As will be shown hereinafter (in connection with FIG. 10), magnetoresistive (MR) elements 40 and 41 form elements of a bridge circuit that cancels common mode noise.

In FIG. 3, the cover 32 is shown as a separate entity which is attached to the plate 22 after the various layers (containing the MR elements and the copper conductors) have been completed. The cover 32 is made up of multiple layers of mu-metal or some other soft magnetic material bonded together to form the cross section shape shown. Well known techniques from magnetic head manufacturing are used to batch process the cover along with the plate such that the individual heads are not separated from each other until the batch fabrication is complete. FIGS. 5 and 6 show a cover that is deposited on the substrate by use of vacuum sputtering. in practice, the fabrication choice for the cover will depend on the application: i.e., primarily on the wear requirement and the coercivity of the magnetic stripe; the bonded cover offers more choices in the selection of materials.

Figure 7:
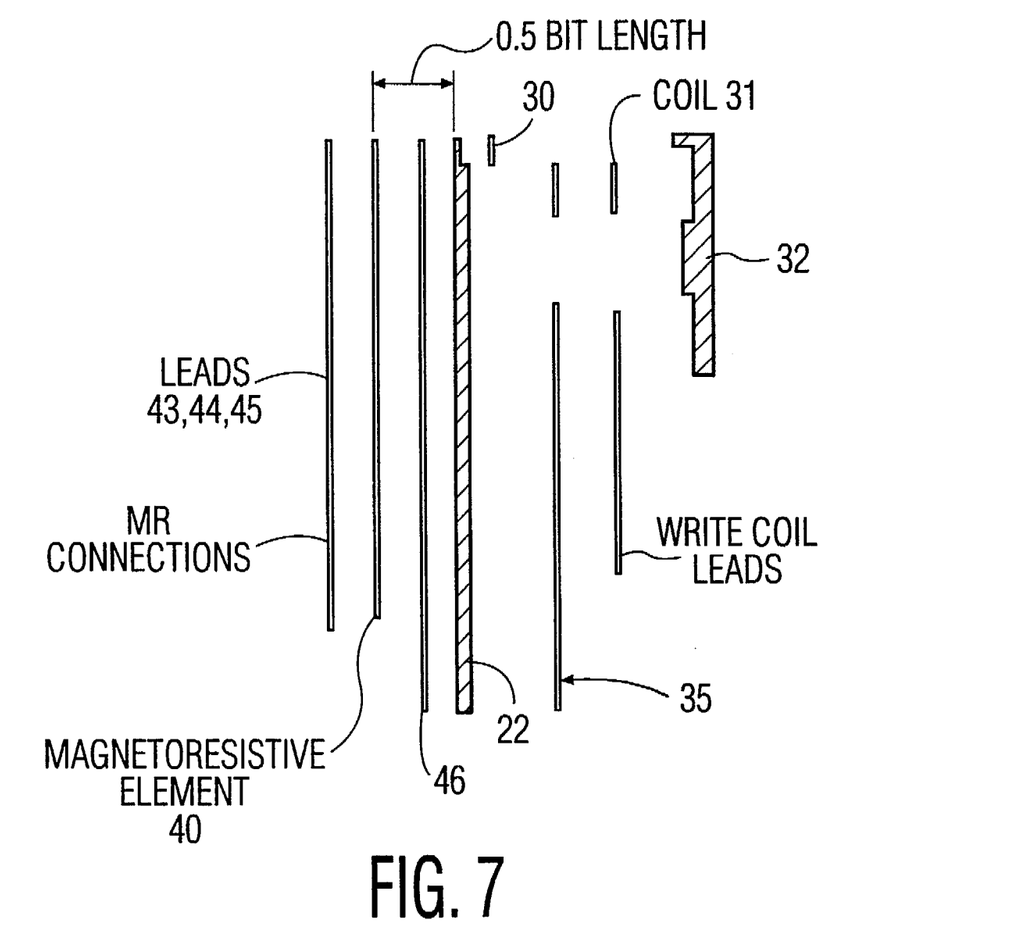
FIG. 7 is an exploded view of the read/write head of FIGS. 2, 3, and 4.

FIG. 7, an exploded view of the head of FIG. 3, shows the relative positions of the various elements of the self-clocking head. On the left side of the substrate 22, are located the two MR read elements 40 and 41, their three copper leads 43, 44, and 45 and the silicon dioxide insulating layer 46. On the right side are located the copper gap spacer 30, the silicon dioxide layer 35, the write coil 31, the write coil leads, and the cover plate 32. It will be noted that the distance between the trailing edge of the write gap and the plane of the MR head (40 and 41) is given ideally as one-half the bit length to be recorded on the card. As will be seen below, this condition is invoked for the purpose of explanation; it is not necessary to hold this dimension to the ideal tolerance of plus or minus 1 percent.

Figure 8:
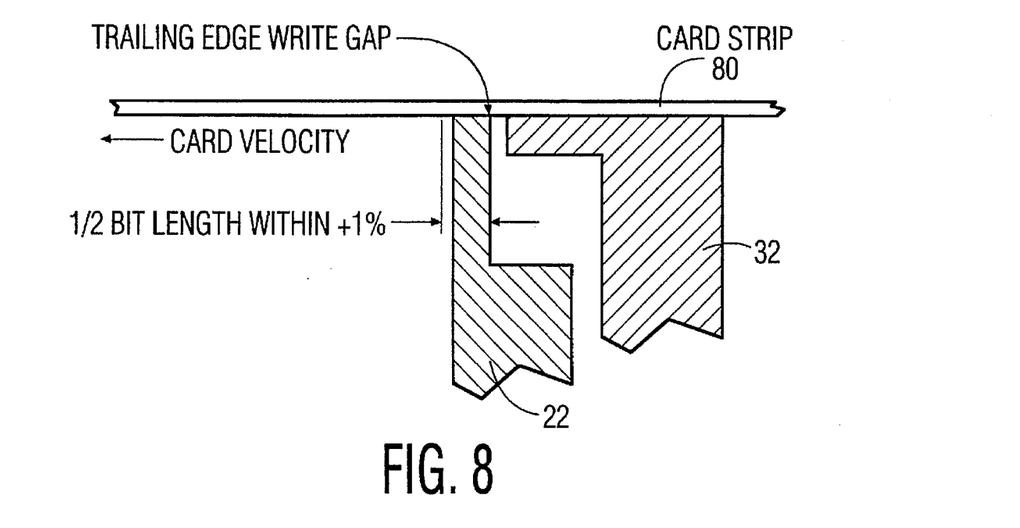
FIGS. 8 and 9 are schematic representations of a portion of the read/write head of FIGS. 2, 3, and 4 and waveforms of the read head output, the digital form of that output and the write current the state change times of which are determined by the transactions in that output.
Figure 9:
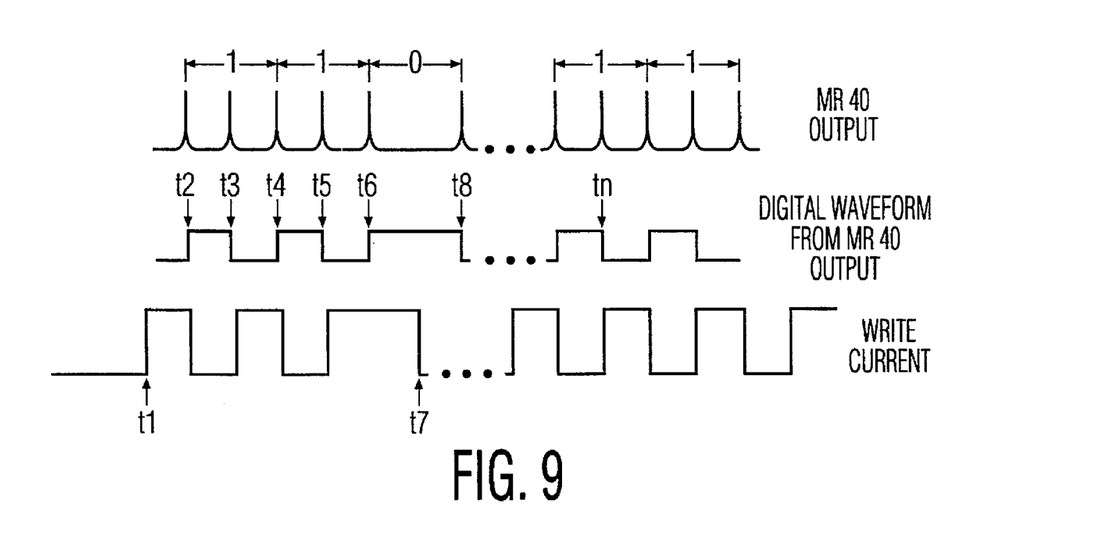

FIGS. 8 and 9, which illustrate the self-clocking write principle of the first embodiment, show a schematic drawing of the write and read elements (for clarity not drawn to scale) and the waveforms of the output of magnetoresistive element (MR) 40, the digitized output, and the write current, respectively. The digitized output controls the timing of the write current direction changes. As shown, a card with magnetic stripe 80 moves from right to left as viewed in FIG. 8. For clarity, the waveforms are drawn for a constant card velocity.

On a virgin card (one that does not contain any encoded data), a single flux reversal is written on the card by means of sensing the leading card edge with a photo detector (not shown) as is common in magnetic stripe card readers. Designate this time instant t1 as shown on the write current waveform. After a time interval that depends on the card velocity, this flux reversal produces a pulse in the output of the MR element 40, at time t2, at which instant, the write current changes direction causing a second flux reversal to be written on the card. In turn, the second flux reversal writes a third reversal, and so on until the card stripe has completely passed by the head. Thus, the card track is covered by equally spaced flux, reversals along its length. The spacing length is precisely equal to the distance between the trailing edge plane of the write gap and the plane of the MR 40 element, which has been chosen to be one-half the bit segment length of the encoded data. What has been demonstrated so far is that the arrangement of FIGS. 5 and 6 are capable of writing precisely spaced flux reversals on the magnetic stripe card, independent of velocity and acceleration.

On a card that contains previously encoded data that must be re-written, the initial flux transition on that card serves to institute the write process described in the preceding paragraph. Once the write process begins, the head erases the previously encoded data.

The so-called Aiken or biphase code specified by the referenced ISO and ANSI standards represents a "one" by a bit segment with a flux reversal in its middle and a "zero" by a bit segment without a middle flux reversal; thus the flux reversals described by the preceding paragraph represent a sequence of ones. To write "zeros" using the scheme of FIGS. 8 and 9 requires a time prediction which is obtained in the following way.

It is noted in FIG. 9 that a "zero" is written by the write current between t5 and t7. Whereas t5 is accurately defined by the flux reversal that actuates the MR read head, no such time determination is available for the t7 required change in the write current. The write electronic logic, to be described determines the t7 value where the current change is needed to suppress a current change at t6. It does this by measuring the time interval (t6–t5) and calculating [t7=t6+(t6–t5)]. Such a prediction calculation can be performed by a microprocessor or it can be performed by say a PAL chip programmed as counter using a count frequency that is greater than say 100 times the bit rate recorded on a card at the maximum usable card velocity. At a card velocity of 50 inches/second, a count frequency of 2 Mhz would provide t7 accurate to one percent of the nominal segment length for the standard 210 bit/inch recording density.

jitter is defined by the referenced ANSI and ISO standards: jitter is the percent deviation of a bit segment from its nominal value, in the case of 210 or 75 (bits per inch) tracks on magnetic stripe cards, the maximum allowed jitter is 10 percent. For 210 bpi on a card moving at a velocity of 50 inches/sec, it can be shown that a card acceleration of 1,000,000 inches/second-squared produces card jitter of 1 percent. At 10 inches per second, 1 percent induced jitter requires an acceleration of 42,000 inches per second-squared. Surprisingly, accelerations approaching these values have been observed in some hand drawn and motorized card encoders on the market. However, careful attention to design details will reduce card acceleration to a fraction of the values cited here. One concludes that the first embodiment of this invention is able to encode cards having jitter well within the allowed values of the referenced standards.

In FIG. 8, the specified distance between the gap trailing edge and MR plane is specified to be 0.50000 bit length plus or minus 1 percent (which for 210 bpi is + or –23 microinches). Although such a close spacing tolerance is not uncommon in microelectronics fabrication, it need not be held here to closer than say 0.0020 inch plus or minus 10 percent (+ or –200 micro-inch). One percent tolerance on jitter can still be achieved by means of a time count adjustment (e.g., software switches) in the electronic circuit; this adjustment is made during final assembly to compensate for variations allowed by the larger spacing tolerance.

Figure 10:
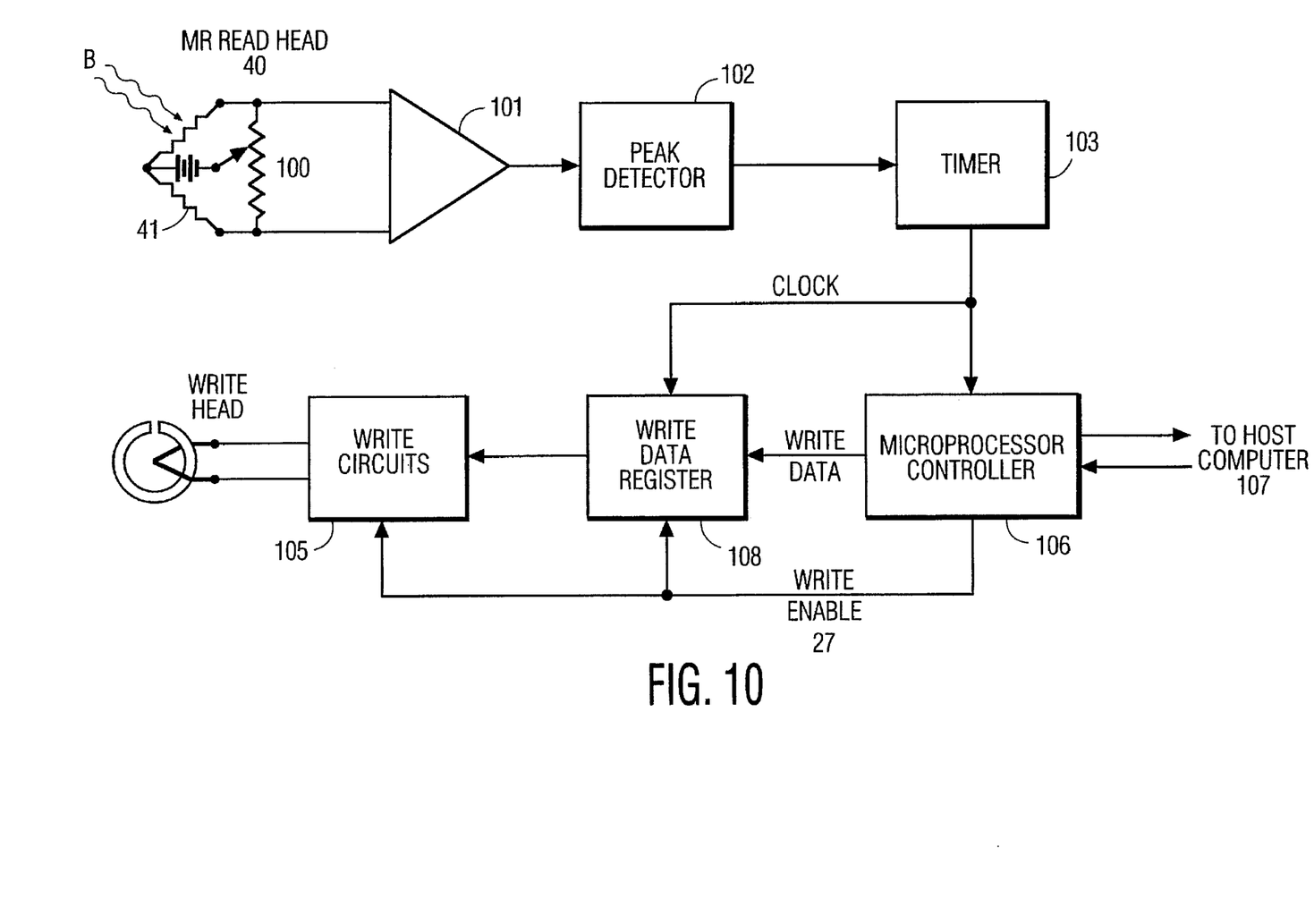
FIG. 10 is a block diagram of the electronic circuit for the operation of the read/write head of FIGS. 2, 3, and 4 employing a single magnetoresistive read head.

FIG. 10 is a block diagram of the electronics, used with the first embodiment of the self-clocking head. MR read head 40 is the active element that senses the card flux transition; it and MR 41 (the passive element) form one side of a bridge circuit which is completed by an adjustable trim potentiometer 100. As mentioned before, the use of the active and inactive elements rejects common mode noise (from power supplies, nearby equipment, the effect of the earth's magnetic field, etc); the advantages of a bridge circuit for detecting low amplitude signals are well known and need no further elaboration herein.

The output of the bridge is amplified by amplifier 101, peak detected by peak detector 102, and fed into a timer circuit 103 that controls the write circuits. The write circuits are represented by block 105. The microprocessor controller 106 performs housekeeping chores, communicates with the host computer 107, supplies new write data to the write data register 108, and decodes the read data. The block diagram of FIG. 10 is adaptable to most applications. Parenthetically, it is mentioned that electronic circuits and microprocessor algorithms for velocity independent decoding of magnetic strip cards using a single head gap are commonplace in the industry and need not be described here.

Consider the value card insert reader/encoder shown schematically by FIG. 1: the card is read on insertion; re-written and read-verified when it is removed. On the way in, the data on the card is read by the MR read head; the read head signal is electronically decoded and sent to the host, which is defined to be an embedded computer in a telephone or vending machine (or some other device) that controls the transaction. If the data is determined to be valid, the host authorizes the transaction, gives the appropriate commands to effect the transaction, and transmits new data to be written on the card. As the card is withdrawn, new data is written and read verified.

What happens, if for some reason, the read verification detects an error on the card when the card is being removed? Typically, value card readers contain a display which instructs the user to reinsert the card for a second or third attempt at proper encoding. If all such attempts fail, the terminal presents to the user a printed receipt showing the remaining balance on his defective, now unusable, card. This receipt along with the defective card can be redeemed by the user. Even though this remedy exists, it is inconvenient for the customer and costly to the card issuer. For such a card system to succeed, the read/write error rate must be less than a small fraction of one percent.

The first embodiment of the self-clocking head of the present invention will significantly improve the read/write reliability as compared to existing devices. The self clocking head uses MR sensing elements that respond to the card flux rather than to the rate of change of flux response found in conventional magnetic heads. Thus, the MR head is approximately 10 times less sensitive to the high field from the write head, assuming that the write current rise time is approximately ⅒ the time between flux reversals. In addition, MR heads can be built to have a magnetostrictive coefficient of zero; conventional heads are highly microphonic. Finally it is noted that the use of two MR elements in the bridge circuit reduces external magnetic field noise. In short, the MR head has a significantly higher signal to noise ratio compared to conventional heads.

Figure 11:
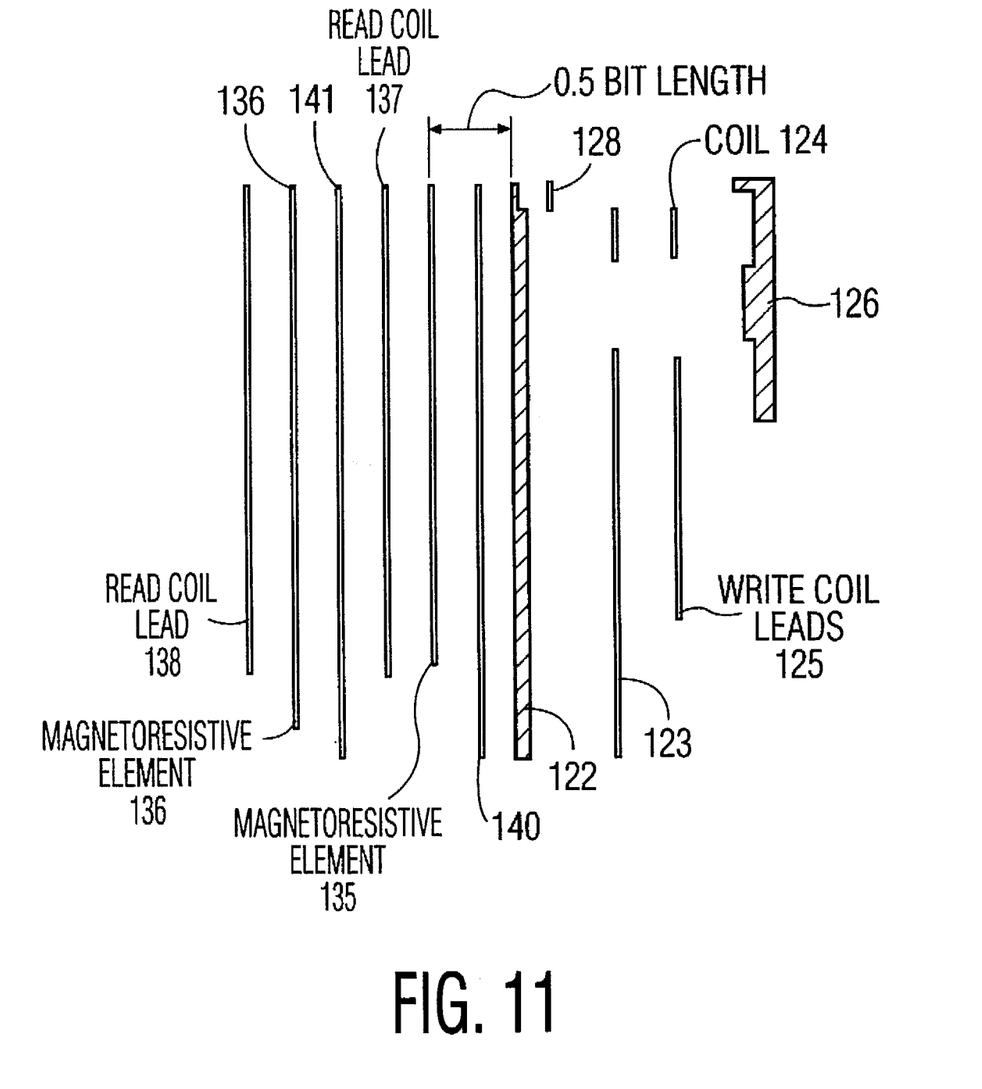
FIG. 11 is an exploded view of another embodiment of this invention employing two magnetoresistive elements for the read head.

FIG. 11 is an exploded view of a second embodiment of this invention which is similar to the first except that a second MR pair identical to the previously described (MR 40 and 41) pair has been added in the (read) plane which is separated from the write plane by precisely ½ bit length. As before, the read plane is separated from the trailing edge of the write gap by ½ bit length.

The figure shows a plate 122 which corresponds to plate 22 of FIG. 7. The plate separates the write plane, to the right of the plate, as viewed in FIG. 11, from the magnetostrictive (MR) read plane to the left of the plate. The write plane comprises silicon oxide layer 123, write coil 125 with leads 124, cover, 126 and unit gap 128. The read plane comprises two MR heads each with an associated MR head to reduce common mode noise as was the case with the embodiment of FIG. 7. The MR elements are designated 135 and 136 in FIG. 11 with associated read coil leads 137 and 138 respectively. The read head also includes silicon oxide (electrically insulating) layers positioned between the MR element (planes) and between element 135 and plate 122 as shown.

The purpose of the second embodiment is to provide anti-counterfeiting and to prevent card alteration. Jitter patterns can be written and read with great accuracy. It follows that security codes can be generated and embedded in the normal digital information contained on a card. Value cards or decrement cards will contain one or more security codes when issued. Each time the card is used to purchase goods or services, the security code will be used to validate the card; at the completion of a transaction, a new security code will be written on the card.

Figure 12:
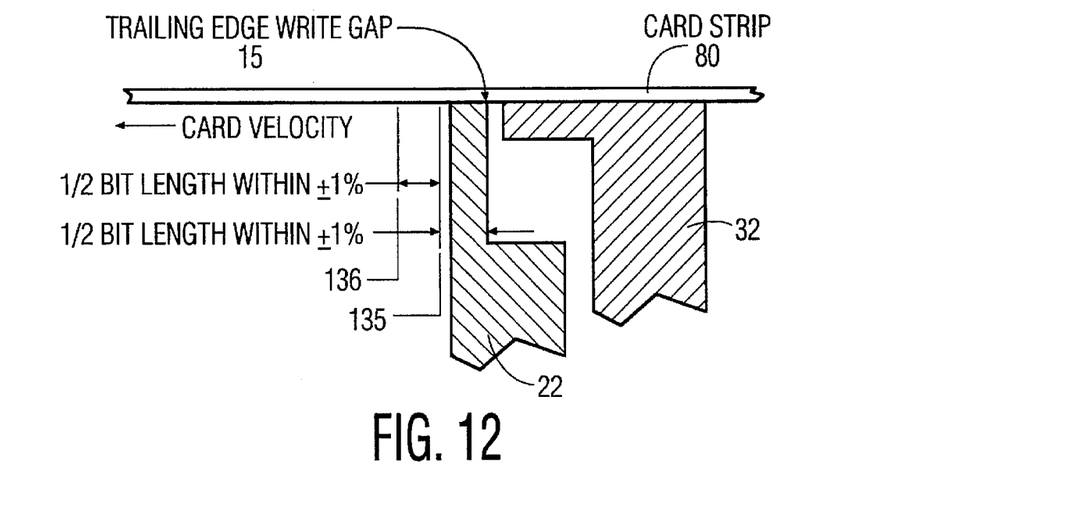
FIGS. 12 and 13 are schematic illustrations of a portion of the read/write head embodiment of FIG. 11 and various waveforms which depict the timing of write clock for the write head therein and the two digital waveforms from the two magnetoresistive elements which determine that timing.
Figure 13:
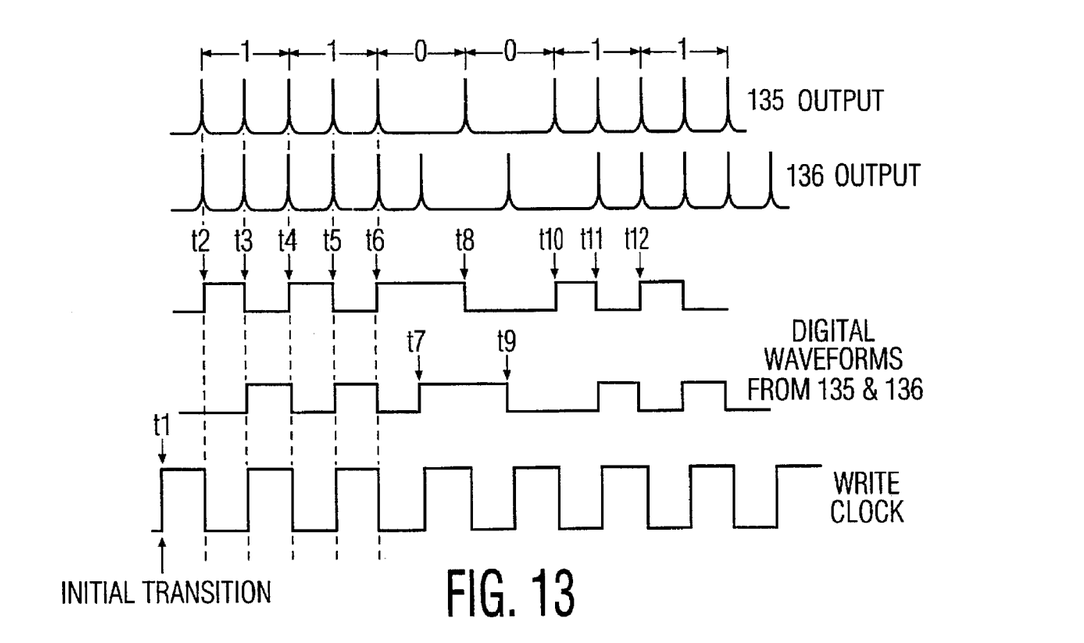

FIGS. 12 and 13 show the write gap, the two MR heads, labeled 135 and 136, the analog and digital waveforms from 135 and 136, and the write clock respectively. The time prediction used in the first embodiment for writing zero bits on the card is no longer required: by combining the digital waveforms from 135 and 136, a write clock is generated that contains all the state changes necessary to precisely locate the write current transitions in the time domain for any sequence of binary ones and zeros. This means that the embodiment of FIG. 11 is capable of writing low jitter data at any card velocity or acceleration—even if the card stops momentarily, proper data will be written. This feature significantly improves the write and read reliability.

As described before, the initial transition shown in FIG. 11 can be provided by either a photodetector that senses the leading card edge or by pre-existing flux change on the card. The other pre-existing flux changes on the card are written over and thereby erased when the card is updated.

Figure 14:
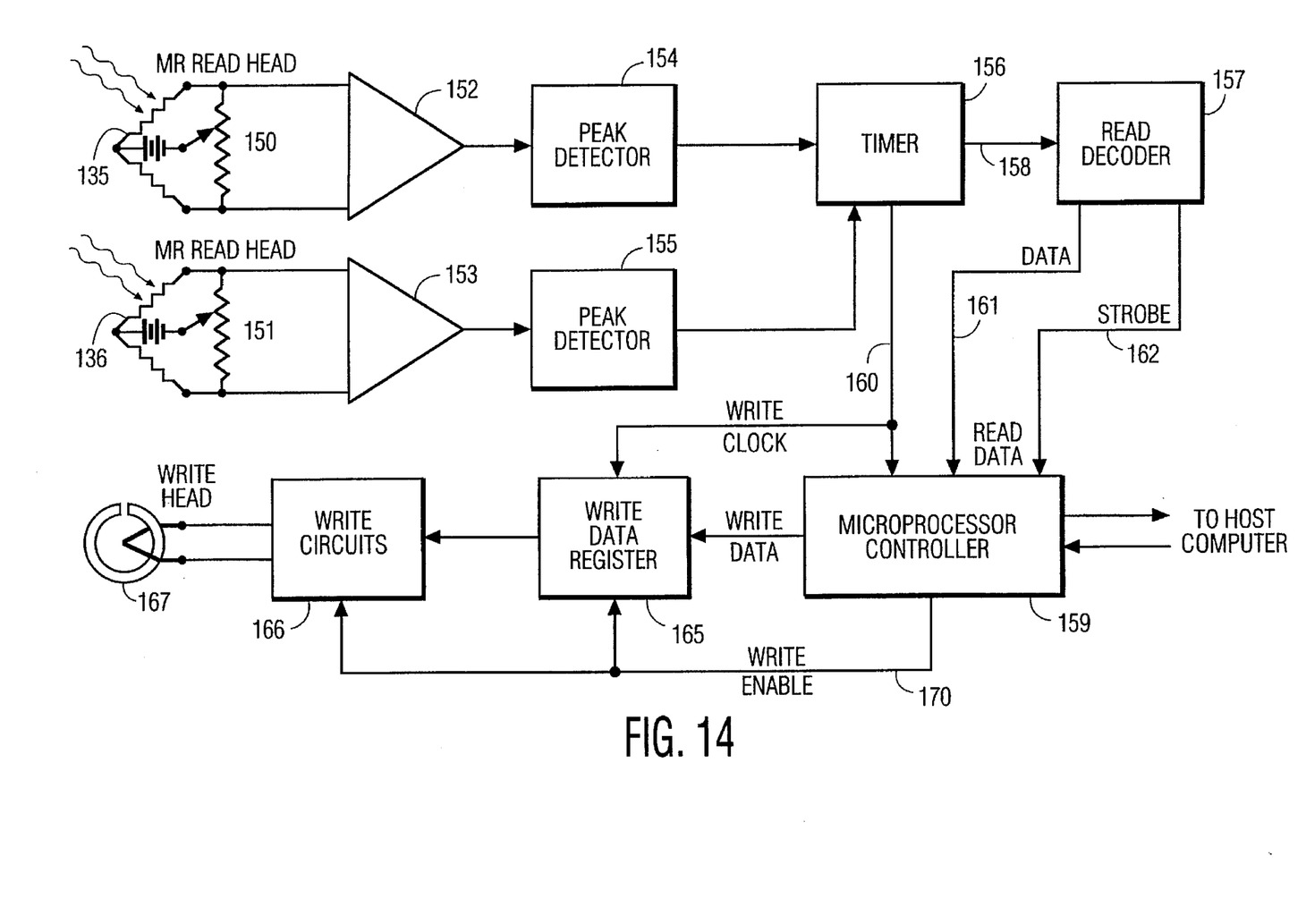
FIG. 14 is a block diagram of the electronics for the embodiment of FIG. 11 employing a read head with two magnetoresistive elements.

FIG. 14 is a block diagram for the electronics for the embodiment of FIG. 11 which includes the two MR read heads 135 and 136. As shown in FIG. 11, each of those heads has an associated MR element (not designated) employed for common mode noise cancellation. The elements are connected into a bridge as shown each with a trimming potentiometers 150 and 151. The outputs from the bridge are connected to amplifiers 152 and 153 respectively. In turn, the outputs of the amplifiers are connected to the input of peak detectors 154 and 155. The outputs of both peak detectors are connected to the input of a timer 156. The outputs of timer 156 are connected to a read decoder 157 (via line 158) and to an input to a microprocessor controller 159 (via line 160).

The outputs of read decoder 157 also are connected to inputs to microprocessor 159 via data line 161 and strobe line 162. Timer 156 output (line 160) also is connected to an input to write data register 165. A write data output from microprocessor 159 is connected to a second input to register 165. The output of register 165 is connected to an input to write circuits 166 the output of which drives the write head 167. Another output of microprocessor 159 is connected to an input to register 165 and write circuit 166 via write-enable line 170.

Consider now the operation of writing and reading a card with the embodiment of FIGS. 11, 12, 13 and 14. The signals from the two MR heads are used to generate the write clock and they are used to recover the data from the card. Both functions must be carried out simultaneously. Additionally, as will be seen, security numbers must be generated and compared to each other, all of which would place a significant burden on the microprocessor. Alternatively, as in FIG. 14, writing and reading decoding are performed by simple logic circuits, leaving the microprocessor free for other tasks such as communicating with the host, generating and comparing security numbers, loading data into the write data register, and controlling the write enable function 170.

In FIG. 14, the signals from the active MR elements are individually amplified, peak detected, and then fed into a timer 156 which combines these signals to generate the write clock. The write clock, in turn, clocks the previously stored data out of the write data register 165. These data are written on the card by the write circuits 166 and the write head 167 such that the flux transitions on the card occur in close synchronization with the write clock.

The two peak detected signals (from 154 and 155) are also passed on to the read decoder 157 which decodes the signals and generates a data stream on strobe lines 161 and 162, respectively. These data are fed into the microprocessor which analyzes the read data content and the embedded security codes to verify the accuracy of both.

Figure 15:
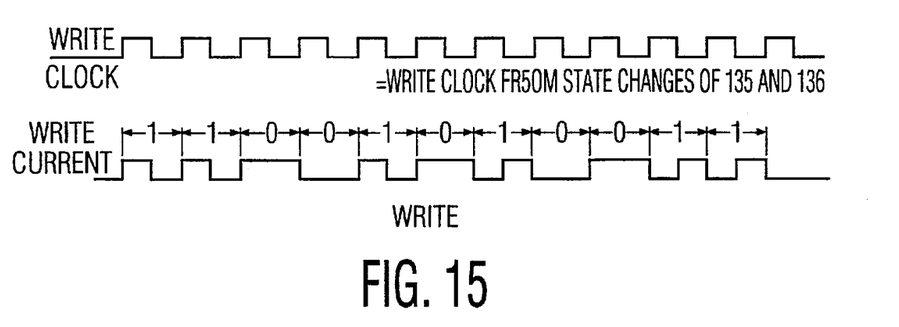
FIGS. 15, 16, and 17 are write, read and decode logic diagrams for the embodiment of FIG. 11.
Figure 16:
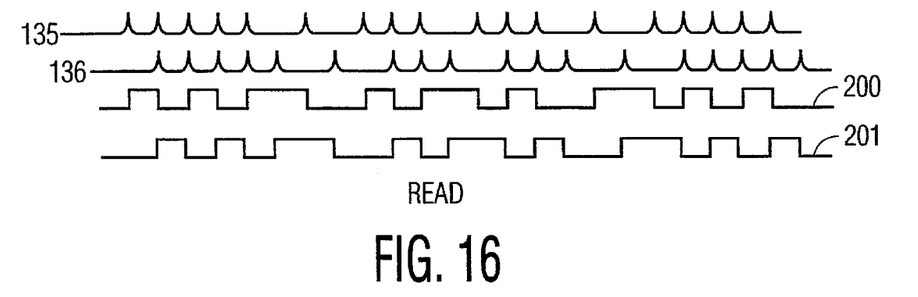
Figure 17:
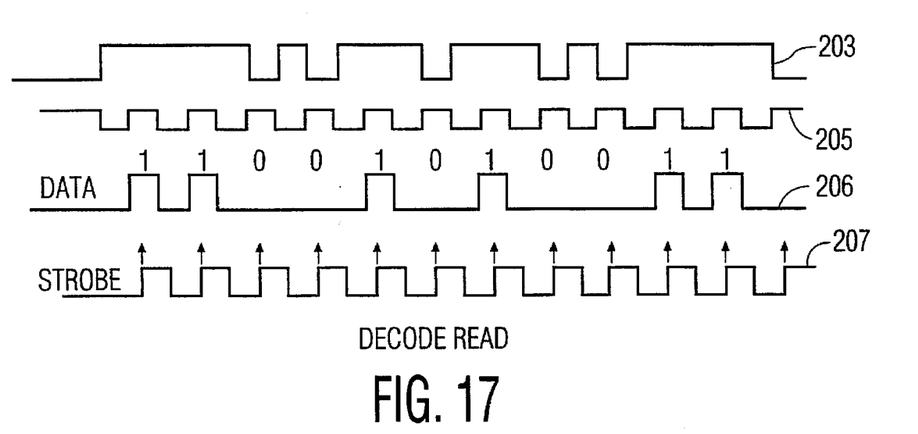

FIGS. 15, 16 and 17 are writes, read, and decode logic diagrams, respectively, that describe the method of generating the write clock and the method of decoding the read signals from the two MR read heads 135 and 136 of FIG. 11. Amplified head signals (from 152 and 153 of FIG. 14) are turned into digital waveforms 200 and 201 (by the peak detectors 154 and 155 of FIG. 14). The write clock, of FIG. 15, is generated by state changes occurring in either of the outputs of the peak detectors.

To decode the read data, first perform an "exclusive or" function on waveforms 200 and 201 which yields waveform 203 of FIG. 17 second, invert the write clock to obtain waveform 205; third, perform an "and" function on waveforms 203 and 205 to obtain the data stream 206 which is high for ones and low for zeros. The data strobe 207 is obtained by shifting the write clock by a time value of ½ the write clock interval.

Thus it has been demonstrated that the second embodiment of this invention is capable of reliable reading and writing on a ANSI & ISO magnetic stripe cards totally independent of card acceleration. Because the second embodiment is more reliable (and foolproof) than the first, it should be employed in systems that operate on high denomination value and decrement cards where errors cannot be tolerated. But its chief value is that it enables a security system to be implemented, a system that will prevent counterfeiting and alteration of the card. This feature will now be described.

Figure 18:
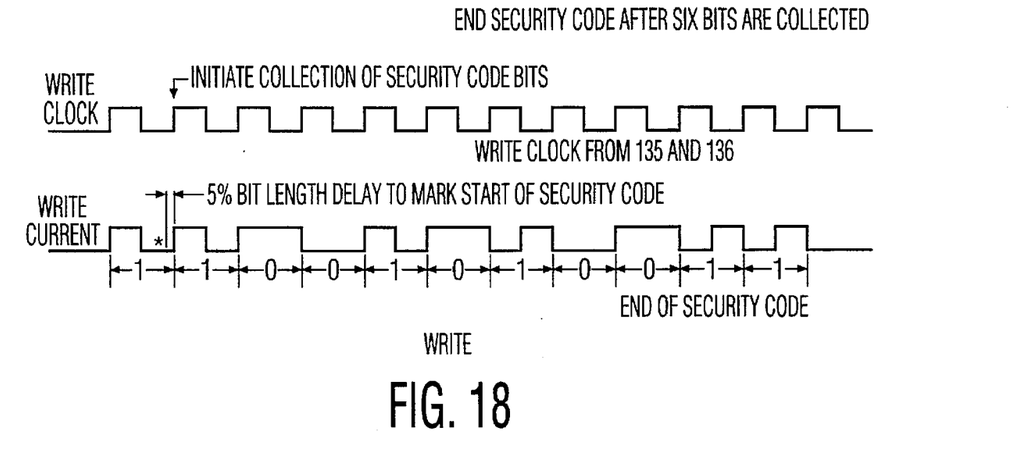
FIGS. 18, 19 and 20 are write, read, and decode read logic diagrams for the embodiment of FIG. 11 depicting the means for generating the embedded security numbers that are used to prevent card counterfeiting and card alteration.
Figure 19:
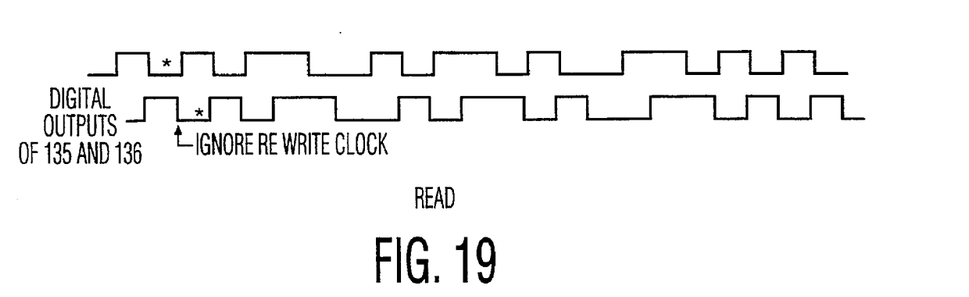
Figure 20:
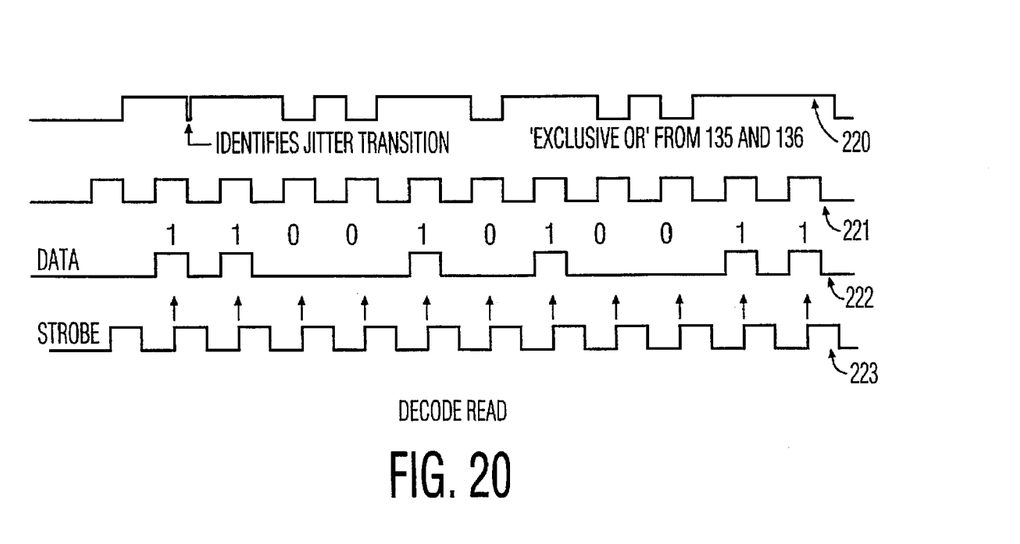

FIGS. 18, 19 and 20 are write, read, and decode read waveform logic diagrams that shows a method of generating a security number on a card by intentionally introducing a bit edge shift at two random position on the card to mark the beginning and end of a sequence of ones and zeros, a subset of the total information in the data field, that will constitute the security number. The diagrams of FIGS. 18, 19 and 20 relate to the embodiment of FIG. 14. Assume for this example that the beginning mark is a bit shift of say 5 percent (of the bit segment length) to the left as shown in the waveform at the bottom of FIG. 18. The end mark is a shift of 5 percent to the right. In between lies the binary number 100101 which constitutes the initial security number (ISN). Suppose that this same binary number exists elsewhere in the data field to be written on the card and that we also mark it in the same way and call it the final security number (FSN). To establish that the card is valid during the subsequent read process, the ISN & FSN numbers are extracted from the data and compared: if they do not match or if either are missing, the card is declared invalid. The host computer (see FIG. 14), includes a memory which stores ISN and FSN numbers with associated user I.D.'s and a comparator to check instant numbers with stored numbers.

The security number can be of any length, it can begin at any position on the card, and its digits need not be derived from contiguous digits in the data field. Given this flexibility, it is virtually certain that two suitable matching numbers can be found in the data field which typically contains over 600 bits in a normal 210 BPI encoded stripe. In the microprocessor 159 of FIG. 14 would reside an algorithm for analyzing the data field, selecting the security numbers, and implementing the write function bit shifts to mark their place.

Because of the precise clocking scheme inherent in the second embodiment of this invention, there exist an infinity of different, reliable ways to generate and compare security numbers—the method described above is but one. Doubtless, each individual commercial application of the self clocking head would, for maximum security, employ its own unique method of generating such security numbers.

One of the techniques available to counterfeiters of credit cards is called skimming, which involves the use of a simple read-write device to copy data from a valid card to a blank card. The device contains a card slot with a write head on one side of the slot and a read head on the other side. Both cards are held firmly together and passed through the slot. The data from the valid card is read and transferred to the blank card presumably preserving all the characteristics of the original, including the jitter pattern.

In the case of value cards or decrement cards skimming is a serious problem. The counterfeiter buys a valid card and makes as many copies as he desires. Each of these copies can be used with the same facility as the original. And the counterfeiter does so with impunity: unless there is a central data base that stores all of the transactions on each issued card, the card issuing agency does not even know that it is being swindled.

What, if anything, prevents skimming in the case of the security system described in accordance with this invention? The answers to this question follows: 1. In general, it is not true that skimming preserves the exact jitter pattern of the original: experimental evidence shows that the skimming process introduces its own jitter which typically exceeds 5 percent because of imperfections in the card stripe, acceleration in the card motion versus the response times of the read and write circuits, write to read crossfeed and other noise, poor head contact, and the physical characteristics of the read and write heads used in the skimming device which doubtless differ from those used by the card issuer to encode the card in the first place. It is unlikely that a counterfeiter would have the fabrication ability and the knowledge to copy cards having the necessary precision in the jitter pattern to defeat the security system of this invention. 2. The counterfeiter's difficulty is compounded by the use of the MR thin film read heads and the finite pole (ie., less than the recorded half-wavelength) on one side (the following edge) of the write gap of this invention which intentionally introduces asymmetrical distortion in the flux pattern written on the card. Attempts to copy a card with this inherent distortion would fail to reproduce the original jitter pattern.

FIGS. 19 and 20 show the read verification of the security code written as discussed hereinbefore. FIG. 19 shows the digital (read) outputs from heads 135 and 136. FIG. 20 shows the exclusive OR waveform 220 from heads 135 and 136, the write clock state changes 221, the data (220 'AND' 221) 222, and the strobe 223.

Figure 21:
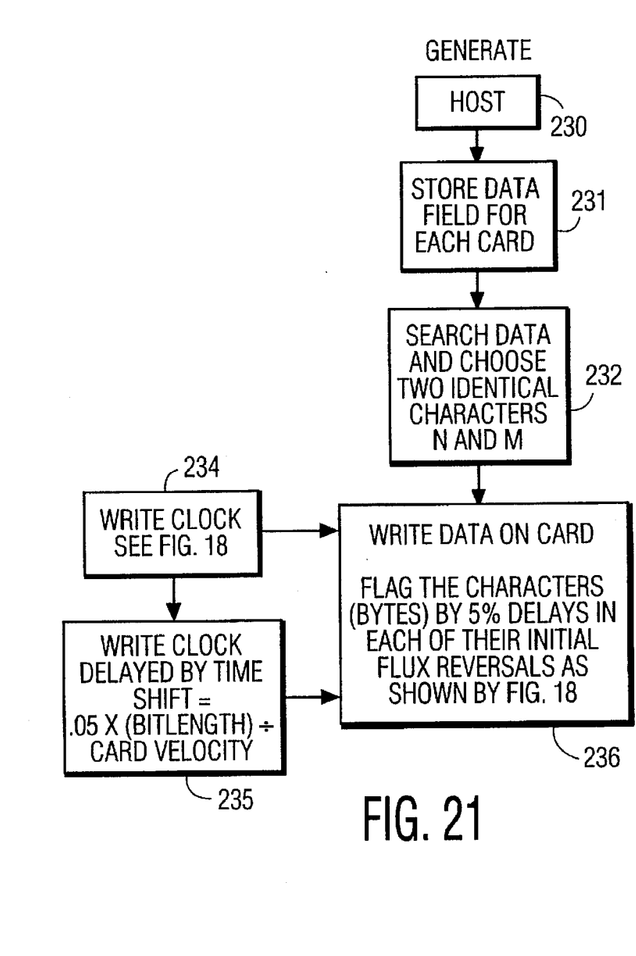
FIGS. 21, 22, and 23 are block diagrams of the methods for generating and verifying a security code in accordance with the principles of this invention.
Figure 22:
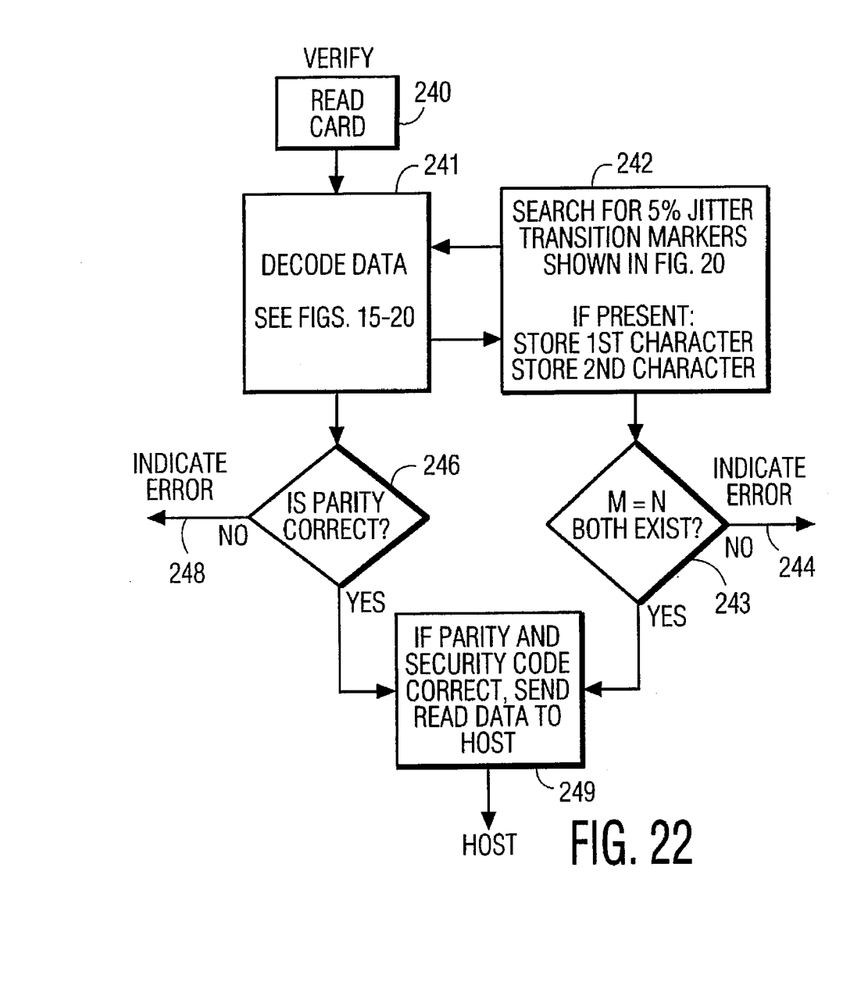

FIGS. 21 and 22 are block diagrams of the method for generating and verifying a security code, respectively, in accordance with one aspect of this invention. As shown in FIG. 21, the host computer, represented by block 230, stores a card data field for each card issued as indicated in block 231. The data field contains 630 bits or 105 bytes of 6-bit alpha-numeric characters. There exists as least one character which appears twice in the data field. The host searches the data field for a card in use and chooses two identical characters that appear in the data field as indicated in block 232. The characters are called M and N and are integers which represent the characters sequential order in the data field.

A card in use enters a write clock, as shown in FIG. 18 and a write clock delayed by a time shift equal to 0.05 times the bit length divided by the card velocity as shown in blocks 233 and 234 of FIG. 21. As shown in block 236, the host writes data on the card and flags the M and Nth bytes by 5% delays in each of their initial flux reversals as shown in FIG. 18.

The code verification method is represented by the block diagram of FIG. 22. The card in use is read as indicated by block 240 in FIG. 22. The data, so read, is decoded as discussed in connection with FIGS. 15–20. The decode operation is represented by block 241. The decode data is searched for 5% jitter transition markers as shown in FIG. 20 (at 220). If present, store the Mth and Nth byte. This search and store operation is represented by block 243. The host determines if M equals N and if both exist as indicated by block 243. If "NO", an error is indicated (line 244). Also, the host does a parity check, read data is sent to the host computer as indicated by block 249.

Figure 23:
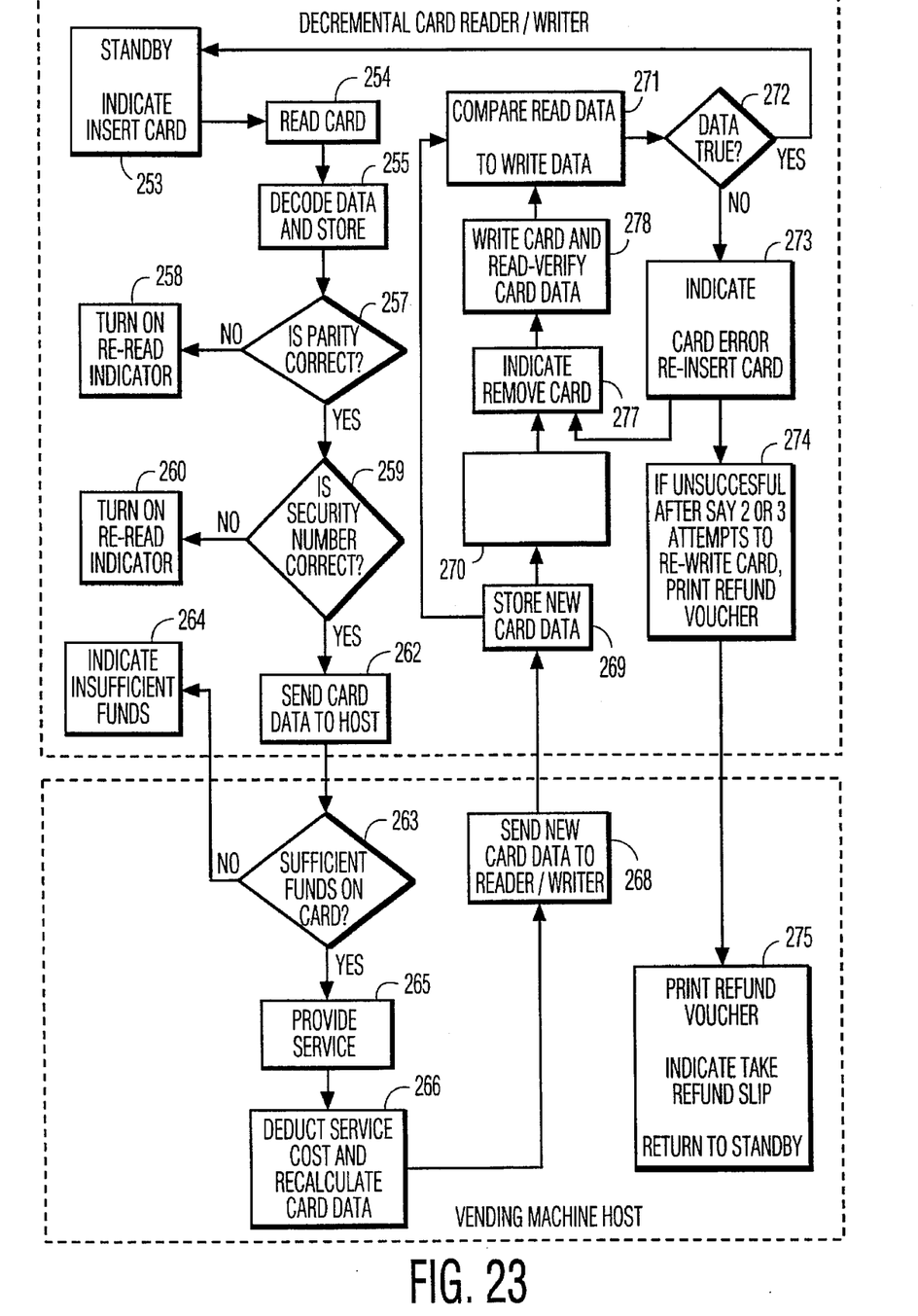

A block diagram for the operation of a decrement (or value) card reader/writer is shown in FIG. 23. The diagram represents the operations of both the decrement card reader and the vending machine host by blocks 250 and 251 respectively.

Operation commences by the insertion of a card as indicated by block 253. The card is read and the data on the card is decoded and stored as indicated by blocks 254 and 255. The parity of the decoded data is checked and, if incorrect, a "RE-READ" indicator is turned on as indicated by blocks 257 and 258.

If parity is correct, the security number is checked as indicated by block 259. If the security number is not correct, the "RE-READ" indicator is turned on as indicated by block 260. If both parity and the security number are correct, the card data is sent to the host as indicated by block 262 and the host checks for sufficient funds on the card as indicated by block 263. If "NO", the lack of sufficient funds is indicated as represented by block 264. If there are sufficient funds, service is provided as indicated by block 265 and the cost of the service is deducted and the card data recalculated as indicated by block 266.

The new card data is sent to the reader/writer as indicated by block 269. The stored data is analyzed to find two 6-bit security numbers and to determine the bit count that locates each number in the data field. This analysis is indicated by block 270. Also, the data read is compared to the write data as indicated by block 271 to determine if the data is true as indicated by block 272. If "YES", a standby mode is indicated. If "NO", a card error is indicated with notice to reinsert as indicated by block 273. If unsuccessful after two or three attempts to re-write a card, a refund voucher is printed as indicated by blocks 274 and 275.

Simultaneously, card data analyzed at block 270 is followed by an indication to remove the card (block 277) if an error is indicated, by writing the card and read-verifying the card data (block 278) and comparing the read data to the write data (block 271).

Although the invention has been described in terms of a value card, the unique read/write head and the security system engendered by it's usage are equally applicable to hand swipe magnetic stripe card usage in general.

What is claimed is:

1. A magnetic card, hand operated reader, said reader including a self clocking unit and read head combination comprising a high permeability magnetic plate having first and second sides and an edge with a thickness of about one half bit length, a magnetic write head connected to said first side at said edge and at least a first magnetoresistive element read head on said second side at said edge, said write head and said magnetoresistive element being thus disposed at said edge about one half bit length apart separated by said high permeability plate.

2. A reader as in claim 1 also including circuitry for compensating for the difference between the actual spacing between said write and read heads and the desired one half bit spacing therebetween.

3. A reader as in claim 1 including a second magnetoresistive element read head on said second side at said edge, said first and second magnetoresistive elements being disposed at said edge about one half bit length apart from said write head by said high permeability plate.

4. A reader as in claim 3 also including first and second common mode magnetoresistive elements electrically in series with said first and second magnetoresistive elements read heads respectively, each of said write head and said first and second read heads being spaced apart by about one half bit spacing.

5. A reader as in claim 3 including first and second common mode magnetoresistive elements electrically in series with said first and second read heads respectively.

6. A reader as in claim 3 also including control circuitry for controlling said write head to encode a coupled magnetic stripe in a manner to introduce an encoded jitter pattern into the encoded data written into said stripe.

7. A reader as in claim 4 in combination with a central store for storing coded jitter patterns in association with user identification's and for comparing codes generated by a user card during a transaction with codes stored for the card user at said central store and for controlling said control circuit.

\* \* \* \* \*